United States Patent
Liu et al.

(10) Patent No.: US 12,136,168 B2
(45) Date of Patent: Nov. 5, 2024

(54) STYLE-CONTROLLED GENERATION OF VISUAL ASSETS FOR VIDEO GAMES USING MACHINE LEARNING

(71) Applicant: Electronic Arts Inc., Redwood City, CA (US)

(72) Inventors: Han Liu, Millbrae, CA (US); Jingwen Liang, Mountain View, CA (US); Jesse Harder, Oakland, CA (US); Gary Ng Thow Hing, Montreal (CA); Mohsen Sardari, Burlingame, CA (US)

(73) Assignee: Electronic Arts Inc., Redwood City, CA (US)

( * ) Notice: Subject to any disclaimer, the term of this patent is extended or adjusted under 35 U.S.C. 154(b) by 487 days.

(21) Appl. No.: 17/463,730

(22) Filed: Sep. 1, 2021

(65) Prior Publication Data
US 2023/0066897 A1    Mar. 2, 2023

(51) Int. Cl.
*G06T 7/11*    (2017.01)
*G06N 3/045*    (2023.01)
(Continued)

(52) U.S. Cl.
CPC ............ *G06T 17/10* (2013.01); *G06N 3/045* (2023.01); *G06N 20/00* (2019.01); *G06T 7/11* (2017.01);
(Continued)

(58) Field of Classification Search
None
See application file for complete search history.

(56) References Cited

U.S. PATENT DOCUMENTS 11,043,026 B1 *  6/2021  Fathi ................ G06N 20/00
2014/0079297 A1 *  3/2014  Tadayon ............ G06V 40/172
                                                 382/118
(Continued)

OTHER PUBLICATIONS

Nishida, et al., Procedural Modeling of a Building from a Single Image, Wiley & Sons, Ltd., Eurographics 2018, vol. 37, No. 2, 15 pages, 2018.
(Continued)

*Primary Examiner* — Joni Hsu
(74) *Attorney, Agent, or Firm* — Gray Ice Higdon (57) ABSTRACT

This specification describes a computing system for generating visual assets for video games. The computing system comprises an image segmentation model, a first 3D generation model, and a second 3D generation model. At least one of the first 3D generation model and the second 3D generation model comprises a machine-learning model. The system is configured to obtain: (i) a plurality of images corresponding to the visual asset, each image showing a different view of an object to be generated in the visual asset, and (ii) orientation data for each image that specifies an orientation of the object in the image. A segmented image is generated for each image. This comprises processing the image using the image segmentation model to segment distinct portions of the image into one or more classes of a predefined set of classes. For each image, 3D shape data is generated for a portion of the object displayed in the image. This comprises processing the segmented image of the image, the orientation data of the image, and style data for the visual asset using the first 3D generation model. 3D shape data is generated for the visual asset. This comprises processing the generated 3D shape data of each image using the second 3D generation model.

20 Claims, 6 Drawing Sheets

(51) Int. Cl.
  *G06N 20/00* (2019.01)
  *G06T 7/55* (2017.01)
  *G06T 17/10* (2006.01)
  *G06T 17/20* (2006.01)
  *G06T 19/20* (2011.01)
(52) U.S. Cl.
  CPC .............. *G06T 7/55* (2017.01); *G06T 17/205* (2013.01); *G06T 19/20* (2013.01); *G06T 2207/20084* (2013.01); *G06T 2210/04* (2013.01)

(56) References Cited

U.S. PATENT DOCUMENTS

| | | | | |
|---|---|---|---|---|
| 2018/0103213 | A1* | 4/2018 | Holzer | G06N 3/04 |
| 2020/0125043 | A1* | 4/2020 | Park | G05B 15/02 |
| 2020/0133978 | A1* | 4/2020 | Ramamurti | G06F 8/38 |
| 2020/0226724 | A1* | 7/2020 | Fang | G06F 18/214 |
| 2021/0074061 | A1* | 3/2021 | Brown | G06T 17/205 |
| 2021/0121781 | A1* | 4/2021 | Benedetto | A63F 13/67 |
| 2021/0256679 | A1* | 8/2021 | Fukuma | G06T 19/003 |
| 2021/0319363 | A1* | 10/2021 | Gillberg | G06V 10/774 |
| 2021/0383115 | A1* | 12/2021 | Alon | G06Q 30/0276 |
| 2022/0172322 | A1* | 6/2022 | Prins | G06T 5/001 |
| 2022/0398461 | A1* | 12/2022 | Jaipuria | G06N 3/084 |

OTHER PUBLICATIONS

Liu, et al., Translational Symmetry-Aware Facade Parsing for 3D Building Reconstructions, IEEE, arXiv:2106.00912v1 [cs.CV], Retrieved from: https://arxiv.org/pdf/2106.00912.pdf, 12 pages, Jun. 2, 2021.

* cited by examiner

STYLE-CONTROLLED GENERATION OF VISUAL ASSETS FOR VIDEO GAMES USING MACHINE LEARNING

BACKGROUND

The generation and customization of visual assets for video games, such as the exterior of video game buildings, is an important part of video game development. It may be desirable to generate visual assets in a particular style, for example, for consistency with existing visual assets for the video game.

SUMMARY

In accordance with a first aspect, this specification describes a computing system for generating visual assets for video games. The computing system comprises an image segmentation model, a first 3D generation model, and a second 3D generation model. At least one of the first 3D generation model and the second 3D generation model comprises a machine-learning model. The system is configured to obtain: (i) a plurality of images corresponding to the visual asset, each image showing a different view of an object to be generated in the visual asset, and (ii) orientation data for each image that specifies an orientation of the object in the image. A segmented image is generated for each image. This comprises processing the image using the image segmentation model to segment distinct portions of the image into one or more classes of a predefined set of classes. For each image, 3D shape data is generated for a portion of the object displayed in the image. This comprises processing the segmented image of the image, the orientation data of the image, and style data for the visual asset using the first 3D generation model. 3D shape data is generated for the visual asset. This comprises processing the generated 3D shape data of each image using the second 3D generation model.

In accordance with a second aspect, this specification describes a computer-implemented method for generating the exterior of a video game building. The method comprises obtaining input data. The input data comprises either text data or image data that specifies features of the exterior of the video game building. Structural data for the exterior of the video game building is generated. This comprises processing the input data using a structure extractor model, wherein the structure extractor model comprises a machine-learning model. Style data for the exterior of the video game building is obtained. 3D shape data for the exterior of the video game building is generated. This comprises processing the structural data and the style data using one or more generation models.

In accordance with a third aspect, this specification describes a non-transitory computer-readable medium storing instructions, which when executed by a processor, cause the processor to obtain: (i) a plurality of images corresponding to a visual asset for a video game, each image showing a different view of an object to be generated in the visual asset, and (ii) orientation data for each image that specifies an orientation of the object in the image; generate a segmented image for each of the images, comprising processing the image using the image segmentation model to segment distinct portions of the image into one or more classes of a predefined set of classes; generate, for each image, 3D shape data for a portion of the object displayed in the image, comprising processing the segmented image of the image, the orientation data of the image, and style data for the visual asset using the first 3D generation model; and generate 3D shape data for the visual asset, comprising processing the generated 3D shape data of each image using the second 3D generation model.

DETAIL DESCRIPTION

This specification describes systems and methods for generating the exterior of video game buildings using machine-learning models. In particular, the described systems and methods enable the generation of video game building exteriors in a particular style. The style is specified or selected, for example, by a user input such as an image representing a reference style for the exterior, text, or any other appropriate input (e.g. selection from a list of options). As different styles may be applied to the video building exterior, the described systems and methods enable a flexible and customizable approach to generating video game building exteriors.

In some implementations, a user may provide a plurality of images that each display a different view of an exterior of a building, which may be a video game building or a real building. In these implementations, orientation information may also be provided for each of the images that specifies an orientation of the exterior of the building in the image. The orientation may be provided in the form of an angle, with respect to a reference point, of the view of the building exterior displayed in the image. Each of the images are processed by an image segmentation model to obtain structural information for the video game building exterior. The image segmentation model processes each image and generates a segmented image for the image. The segmented image provides structural information for the exterior of the building as it divides distinct portions of the image into different segments according to different classes. For example, one or more regions of the segmented image may specify where windows are, one or more further regions may specify where doors are, etc. The user also provides a selection of a style for the exterior of the video game building to be generated. The selection may be provided in the form of a reference style image, text, and/or by selection from a list of possible style options (e.g. modern, traditional, European, etc.). The user provided inputs are processed by systems and methods described herein to generate 3D shape data for the exterior of the building that matches structurally to the building specified in the plurality of images, and matches to the style selected by the user. The 3D shape data represents a mesh (e.g. a polygon mesh) of the entire exterior of the video game building (e.g. as displayed by the different views in the plurality of images).

In some implementations, users may provide a text input that specifies features of the exterior of a video game building to be generated. For example, a user may provide a text input such as "Generate a modern style building with 8 floors using simple glass windows". In these implementations, the text input is processed by a semantic analysis model that extracts structural information and style information for the video game building exterior to be generated. In the above example, the extracted structural information may represent that the exterior of the video game building should have 8 floors. The described systems and methods may further determine a number of windows for each floor of the exterior of the video game building, and include this as part of the structural information. The style information extracted from the text input in this example specifies that the exterior of the video game building should be generated in a modern style. The structural information and style information are processed by systems and methods described herein to generate 3D shape data for the exterior of the building that matches the style and structure specified in the text input. The 3D shape data generated in these implementations may be for a portion of the video game video game building exterior (e.g. one side of the exterior) or for the entire video game building exterior. The 3D shape data represents a mesh (e.g. a polygon mesh) for the video game building exterior (or a portion thereof).

In various implementations, visual assets may be rendered, displayed and/or caused to be displayed in a video game based on the corresponding 3D shape data. For example, a renderer may access the 3D shape data, and render the visual asset using the 3D shape data while the video game is being played. Further data such as texture information for the visual asset may also be used by the renderer for rendering of the visual asset.

Figure 1:
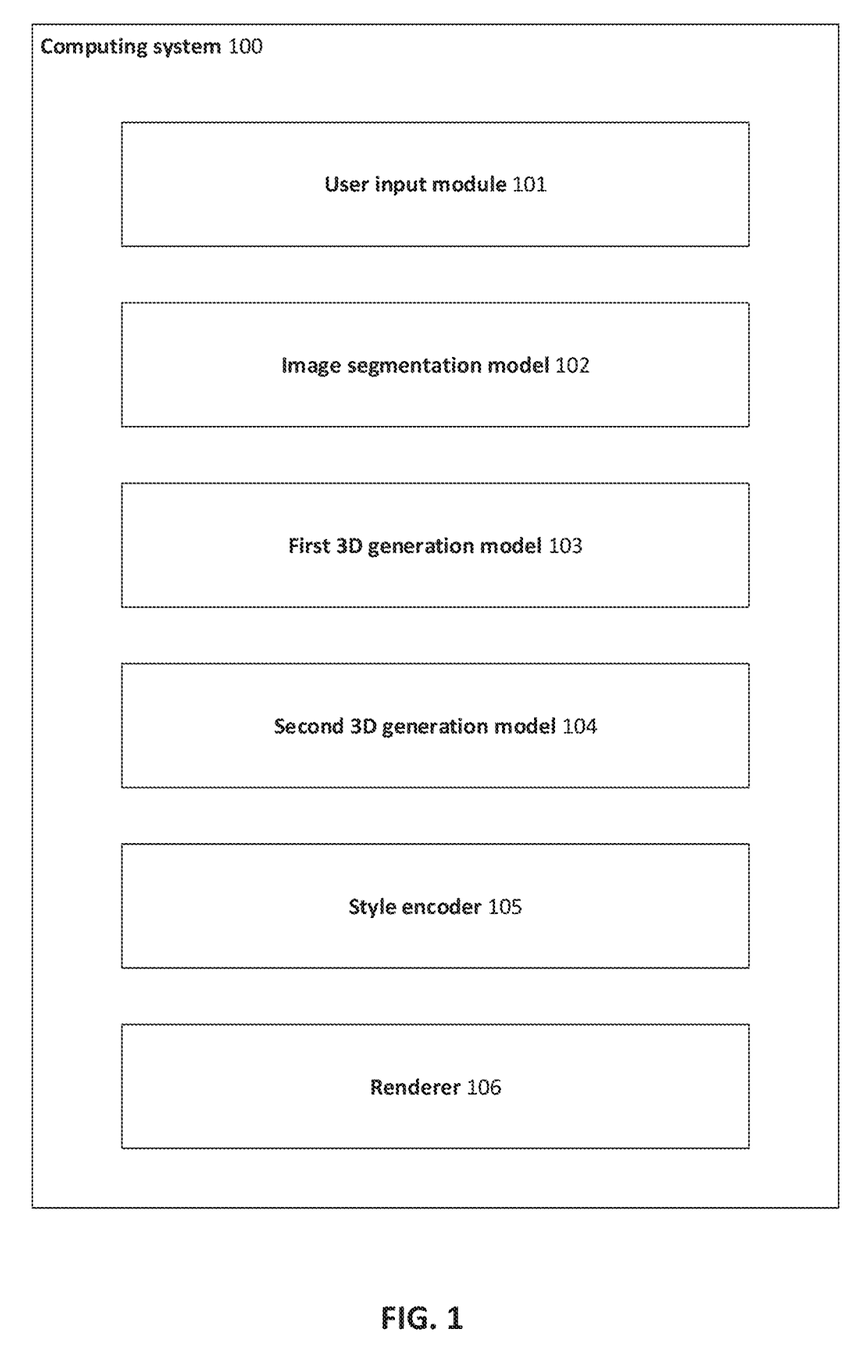
FIG. 1 is a schematic block diagram illustrating an example of a computer system for generating the exterior of a video game building.

FIG. 1 is a schematic block diagram illustrating an example of a computer system 100 for generating the exterior of a video game building. The computing system 100 may be used or accessed during a video game development process when developing exteriors of video game buildings.

The computing system 100 comprises a user input module 101, an image segmentation model 102, a first 3D generation model 103, a second 3D generation model 104, a style encoder 105, and a renderer 106.

The user input module 101 is configured to receive a user input, which may be received by any appropriate input mechanism such as by a user interacting with a user interface. The user input comprises a plurality of images, each image displaying a different view of an exterior of a building. The images may display the exterior of a video game building or the exterior of a real building. Each image comprises a number of pixels, and has a height, width, and number of channels (e.g. 3 channels for RGB images). Each image of the plurality of images may be of the same size, or the images may be of differing sizes.

Orientation data is also provided for each image. The orientation data may be specified in the user input or may be specified in metadata associated with the image. The orientation data for an image specifies an orientation of the building exterior in the image. For example, the orientation data may comprise an angle, with respect to a reference point (e.g. a centre point of the building), of the view of the exterior of the building. For example, four images may be provided that each display a different side of the exterior of the building. An angle of 0° may be provided for the first image, an angle of 90° may be provided for the second image, an angle of 180° may be provided for the third image, and an angle of 270° may be provided for the fourth image. In another example, a larger number of different images may be provided showing different portions of the exterior of a stadium, each image being associated with corresponding orientation data. It will be appreciated that for other building shapes a suitable number of images and any suitable orientation data may be provided so as to allow generation of 3D shape data for the building exterior as described in more detail below.

The user input further comprises a selection of a style for the exterior of the video game building to be generated. The user input may comprise an image of a reference style for the exterior of the video game building. In this case, the image of the reference style is processed by style encoder 105 to generate style data (e.g. a style encoding) corresponding to the style portrayed in the image. For example, the style encoder 105 may output a style encoding (e.g. a latent vector) that represents style features for the image. In these implementations, the style encoder 105 may comprise a convolutional neural network that has been trained to generate style encodings for reference images.

Alternatively, the selection of a style may be provided by a user selecting one or more styles, which may be in the form of text or from a list of possible style options (e.g. "modern", "traditional", "European", etc.). In these implementations, the selected styles may be processed by style encoder 105 to generate style data (e.g. a style encoding). For example, the style encoder 105 may be configured to produce embeddings (e.g. word embeddings) for each selected style, which may be then combined (e.g. by summation, averaging, etc.) to generate the style encoding. In these implementations, the style encoder may comprise a recurrent neural network trained to generate style encodings. Alternatively, the style encoder 105 may determine pre-defined encodings for the selected styles, e.g. by determining a one-hot vector for each style selected from a list, and generate a style encoding from the pre-defined encodings. For example, the pre-defined encoding of each style may be combined by a summation, an averaging, etc.

For illustrative purposes, the style encoder 105 is shown as a separate component of the computing system 100, however it will be appreciated that in some implementations, the style encoder 105 may form part of the first 3D generation model 103.

The plurality of images specified in the user input are received by the image segmentation model 102. The segmentation model 102 is a model that processes each image and generates a segmented image for the image. The segmented image is divided into a plurality of distinct portions (i.e. segments) that each correspond to a particular class. For example, the segmentation model 102 may output a segmented image that is the same size as the corresponding image that has been processed, and that comprises a label for each of one or more distinct portions of the image. A label specifies an object displayed in an exterior of a building. For example, one or more portions of the image may have a "window" label, a further one or more portions of the image may have a "door" label, etc. Each label of a pre-defined set of labels may be represented by a different vector, integer, or any other suitable representation for the label. The segmentation model 102 may comprise a machine-learning model. For example, the segmentation model 102 may comprise a convolutional neural network comprising one or more convolutional layers. The output layer of the convolutional neural network may be a softmax layer that outputs, for each pixel (or any other region) of the image, probabilities for each label of a pre-defined set of labels. A label with the highest probability for a pixel (or region) may be selected as the output for the pixel.

The first 3D generation model 103 receives a plurality of inputs, each input being determined from an image of the plurality of images. Each input comprises the segmented image for the image, the orientation data for the image, and style data for the video game building exterior. As described previously, the style data may be a style encoding generated by style encoder 105. The segmented image, the orientation data, and the style data may be combined before being input into first 3D generation model 103, e.g. by concatenation. The first 3D generation model 103 processes each input and generates 3D shape data for the portion of the building exterior displayed in the image. For example, the image may only display one side of the building exterior, and the 3D shape data portion may be determined for that side only. The 3D shape data may be a mesh such as a polygon mesh, e.g. a triangle mesh, wherein vertices are arranged in polygons to form the surface of the exterior of the video game building. The 3D shape data generated by the first 3D generation model 103 represents a portion of the video game building exterior that matches the structural information specified by the segmented image for the image, and matches the style specified by the style data.

The first 3D generation model 103 may comprise a machine-learning model, such as a neural network. For example, the first 3D generation model 103 may comprise a generator neural network of a conditional generator adversarial network that has been trained to generate 3D shape data for portions of the exterior of the video game building. The generator neural network may be configured to receive a latent vector (e.g. sampled from a noise distribution), and a conditioning input, and process these inputs to generate 3D shape data for a portion of a video game building exterior in accordance with the conditioning input. In these implementations, the conditioning input comprises a segmented image for an image displaying a view of an exterior of a building, the orientation data for the image, and style data for the video game building exterior. The generator neural network may comprise one or more convolutional layers.

The second 3D generation model 104 receives a plurality of inputs, each input comprising the 3D shape data generated by the first 3D generation model 103 for an image. The plurality of inputs may be combined before being input into the second 3D generation model 104, e.g. by concatenation. The second 3D generation model 104 processes the input and generates 3D shape data for the video game building exterior. By processing the plurality of 3D shape data generated by the first 3D generation model 103 together, the second 3D generation model 104 may be said to "stitch" together the 3D shape data for the various portions of the video game building exterior and generate 3D shape data for the entire exterior of the video game building.

The second 3D generation model 104 may comprise a machine-learning model, such as a neural network. For example, the second 3D generation model 104 may comprise a generator neural network of a conditional generative adversarial network. The generator neural network may be configured to receive a latent vector (e.g. sampled from a noise distribution), and a conditioning input, and process these inputs to generate 3D shape data for the video game building exterior in accordance with the conditioning input. In these implementations, the conditioning input comprises the plurality of 3D shape data generated by the first 3D generation model 103.

Alternatively, the second 3D generation model 104 may comprise a procedural model. Procedural models use a procedural generation process to generate 3D shape data for the exterior of the video game building, using a plurality of rules and associated parameters for the rules. For example, the rules may specify how different portions of the exterior of the video game building (as specified by the 3D shape data generated by the first 3D generation model 103) should be combined in order to form the entire exterior of the video game building. For example, the procedural generation process may use grammars which specify the different types of rules, and how they are applied to generate the exterior of the video game building. Rules may be applied at different levels, or hierarchies. For example, one or more rules may specify how walls of a video game building exterior should be combined together in accordance with 3D shape data generated for each wall, a further one or more rules may specify how windows should be placed in a wall in accordance with 3D shape data generated for the wall, etc. The parameters of a rule may specify constraints on object locations, sizes, or any other appropriate aspect of a configuration of an object to which the rule is applied.

The renderer 106 is configured to receive the outputs generated by the second 3D generation model 104 and render the exterior of the video game building in accordance with the object configurations specified in the output of the second 3D generation model 104. The renderer 106 receives the 3D shape data for the exterior of the video game building and may determine appropriate additional assets (e.g. texture data) for the exterior of the video game building and subsequently render the exterior using the determined game assets. The renderer 106 may be part of a video game development application for developing building exteriors.

Figure 2:
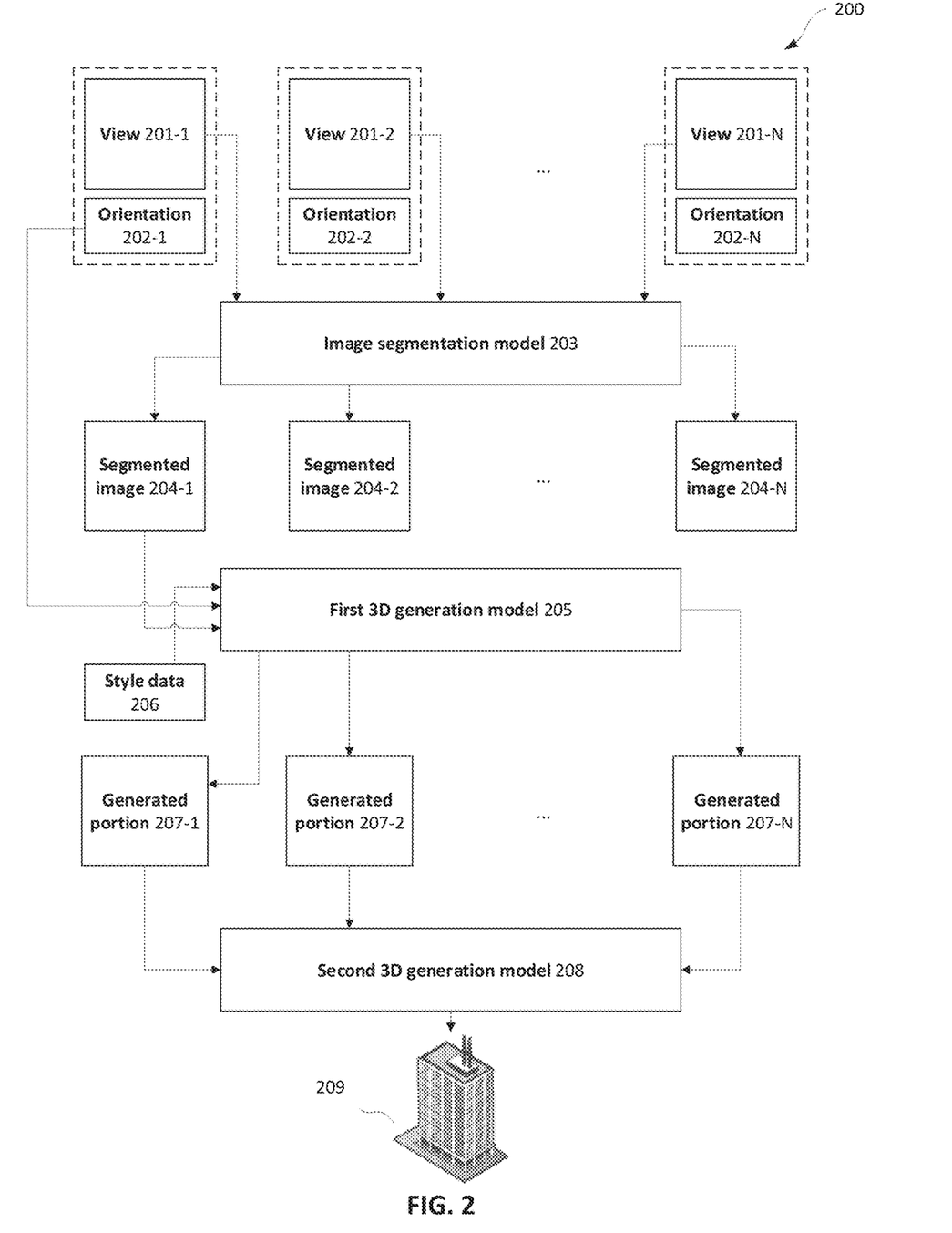
FIG. 2 illustrates an example method for generating the exterior of a video game building.

FIG. 2 illustrates an example method 200 for generating the exterior 209 of a video game building. The method 200 illustrates methods described in relation to FIG. 1 previously.

The image segmentation model 203 receives a plurality of images 201-1, 201-2, 201-N, wherein each image 201 displays a different view of the exterior of a building. The images 201 may display the exterior of a video game building or the exterior of a real building. Each image comprises a number of pixels, and has a height, width, and number of channels (e.g. 3 channels for RGB images). Each image of the plurality of images may be of the same size, or the images may be of differing sizes.

Each image 201 is associated with orientation data 202 for the image 201. For example, as shown in FIG. 2, image 201-1 is associated with orientation data 202-1, image 201-2 is associated with orientation data 202-2, and image 201-N is associated with orientation data 202-N. The orientation data 202 for an image 201 specifies an orientation of the building exterior in the image 201. For example, the orientation data may comprise an angle, with respect to a reference point (e.g. a centre point of the building), of the view of the exterior of the building. For example, four images may be provided that each display a different side of the exterior of the building. An angle of 0° may be provided for the first image, an angle of 90° may be provided for the second image, an angle of 180° may be provided for the third image, and an angle of 270° may be provided for the fourth image. However, it will be appreciated that any number of images and any suitable orientation data may be provided.

Each image 201 is processed by the image segmentation model 203 to generate a segmented image 204. As shown in FIG. 2, image 201-1 is processed to generate segmented image 204-1, image 201-2 is processed to generate segmented image 204-2, and image 201-N is processed to generate segmented image 204-N.

The segmentation model 203 is a model that processes each image 201 and generates a segmented image 204 for the image 201. The segmented image 204 is divided into a plurality of distinct portions (i.e. segments) that each correspond to a particular class. For example, the segmentation model 203 may output a segmented image 204 that is the same size as the corresponding image 201 that has been processed, and that comprises a label for each of one or more distinct portions of the image. A label specifies an object displayed in an exterior of a building. For example, one or more portions of the image may have a "window" label, a further one or more portions of the image may have a "door" label, etc. Each label of a pre-defined set of labels may be represented by a different vector, integer, or any other suitable representation for the label. The segmentation model 203 may comprise a machine-learning model. For example, the segmentation model 203 may comprise a convolutional neural network comprising one or more convolutional layers. The output layer of the convolutional neural network may be a softmax layer that outputs, for each pixel (or any other region) of the image, probabilities for each label of a pre-defined set of labels. A label with the highest probability for a pixel (or region) may be selected as the output for the pixel.

In implementations where the image segmentation model 203 comprises a machine-learning model, the image segmentation model 203 is trained using a plurality of training examples. Each training example comprises a training input and a target output. The training input of a training example comprises an image displaying a view of an exterior of a building (which may be a real building, or a video game building). The target output of a training example comprises a segmented image for the training input that is divided into a plurality of segments that each correspond to a particular class. The training input of a training example is processed in accordance with a current set of parameters of the image segmentation model 203 and a predicted segmented image is generated by the image segmentation model 203. Parameters of the image segmentation model 203 are updated in dependence on a loss/objective function that compares the predicted segmented image with the target output of the training example. For example, the loss function may comprise an L1 loss, an L2 loss, a cross-entropy loss or any other suitable loss. The objective/loss function may be optimized using any suitable optimization process e.g. gradient-descent based methods such as stochastic gradient descent, mini-batch gradient descent, batch gradient descent, AdaGrad, Adam, RMSProp, etc.

Each segmented image 204 is received by the first 3D generation model 205, in addition to orientation data 202 for each image 201, and style data 206 for the video game building exterior 209. For illustrative purposes, FIG. 2 only displays the first 3D generation model 205 processing inputs associated with the first image 201-1, however it will be appreciated that the first 3D generation model 205 also processes inputs associated with the other images 201-2, 202-N in a similar manner. The style data 206 is the same for each input associated with each image 201. For example, style data 206 is used when processing segmented image 204-2 and orientation data 202-2, and also when processing segmented image 204-N and orientation data 202-N. As described in relation to FIG. 1, the style data 206 may be obtained from output of a style encoder (not displayed).

The first 3D generation model 205 processes each input associated with an image 201 and generates 3D shape data 207 for the portion of the building exterior displayed in the image 201. For example, inputs associated with image 201-1 comprise segmented image 204-1, orientation data 202-1, and style data 206, which inputs are processed to generate 3D shape data 207-1 for a portion of the exterior of the building displayed in image 201-1. Similarly, inputs associated with image 201-2 are processed to generate 3D shape data 207-2 corresponding to image 201-2, and inputs associated with image 201-N are processed to generate 3D shape data 207-N corresponding to image 201-N.

The first 3D generation model 205 may comprise a machine-learning model, such as a neural network. For example, the first 3D generation model 205 may comprise a generator neural network of a conditional generative adversarial network. The generator neural network may be configured to receive a latent vector (e.g. sampled from a noise distribution), and a conditioning input, and process these inputs to generate 3D shape data for a portion of a video game building exterior in accordance with the conditioning input. The conditioning input comprises a segmented image 204 for an image 201, the orientation data 202 for the image, and style data 206 for a video game building exterior. The generator neural network may comprise one or more convolutional layers.

In implementations where the first 3D generation model 205 comprises a machine-learning model, the first 3D generation model 205 is trained using a plurality of training examples. Each training example comprises a training input and a target output. The training input of a training example comprises: (i) a segmented image of a view of an exterior of a building (which may be a real building, or a video game building), (ii) orientation data for the image, and (iii) style data specifying a style of a portion of a building exterior represented in the target output. The target output of a training example comprises 3D shape data for a portion of the building exterior that is represented in the segmented image, in a style as specified by the style data of the training input. The training input of a training example is processed in accordance with a current set of parameters of the first 3D generation model 205 and predicted 3D shape data is generated by the first 3D generation model 205. Parameters of the first 3D generation model 205 are updated in dependence on a loss/objective function that compares the predicted 3D shape data with the target output of the training example. For example, the loss function may comprise an adversarial loss, an L1 loss, an L2 loss, or any other suitable loss. The objective/loss function may be optimized using any suitable optimization process e.g. gradient-descent based methods such as stochastic gradient descent, mini-batch gradient descent, batch gradient descent, AdaGrad, Adam, RMSProp, etc.

In implementations where the first 3D generation model 205 comprises a generator neural network, the generator neural network may be trained using an adversarial training process, which makes use of a discriminator neural network to evaluate the likelihood that an output generated by the generator neural network is "real" data. The adversarial training process comprises training a generator neural network to generate outputs that are realistic (e.g. when compared to target outputs of a training dataset) such that the discriminator neural network inaccurately predicts the outputs generated by the generator neural network to be "real" data (e.g. data from a set of real training examples), while simultaneously learning a discriminator neural network that aims to accurately distinguish between "real" data and "synthetic" data that is generated by the generator neural network. Adversarial loss functions may be used to train the conditional generative adversarial network, along with a suitable optimization process e.g. gradient-descent based methods such as stochastic gradient descent, mini-batch gradient descent, batch gradient descent, AdaGrad, Adam, RMSProp, etc.

The 3D shape data 207-1, 207-2, 207-N generated by the first 3D generation model 205 are received by the second 3D generation model 208. The 3D shape data 207-1, 207-2, 207-N may be combined, e.g. by concatenation, to form an input to the second 3D generation model 208. The second 3D generation model 208 processes the input and generates 3D shape data 209 for the entire exterior of the video game building.

The second 3D generation model 208 may comprise a machine-learning model, such as a neural network. For example, the second 3D generation model 208 may comprise a generator neural network of a conditional generative adversarial network. The generator neural network may be configured to receive a latent vector (e.g. sampled from a noise distribution), and a conditioning input, and process these inputs to generate 3D shape data 209 for the video game building exterior in accordance with the conditioning input. In these implementations, the conditioning input comprises the plurality of 3D shape data 207 generated by the first 3D generation model 205.

Alternatively, the second 3D generation model 208 may comprise a procedural model. Procedural models use a procedural generation process to generate 3D shape data 209 for the exterior of the video game building, using a plurality of rules and associated parameters for the rules. For example, the rules may specify how different portions of the exterior of the video game building (as specified by the 3D shape data generated by the first 3D generation model 205) should be combined in order to form the entire exterior of the video game building. For example, the procedural generation process may use grammars which specify the different types of rules, and how they are applied to generate the exterior of the video game building. Rules may be applied at different levels, or hierarchies. For example, one or more rules may specify how walls of a video game building exterior should be combined together in accordance with 3D shape data 207 generated for each wall, a further one or more rules may specify how windows should be placed in a wall in accordance with 3D shape data 207 generated for the wall, etc. The parameters of a rule may specify constraints on object locations, sizes, or any other appropriate aspect of a configuration of an object to which the rule is applied.

In implementations where the second 3D generation model 208 comprises a machine-learning model, the second 3D generation model 208 is trained using a plurality of training examples. Each training example comprises a training input and a target output. The training input of a training example comprises 3D shape data for each of a plurality of different portions of a building exterior. The target output of a training example comprises 3D shape data for the entire building exterior. The training input of a training example is processed in accordance with a current set of parameters of the second 3D generation model 208 and predicted 3D shape data for the entire building exterior is generated by the second 3D generation model 208. Parameters of the second 3D generation model 208 are updated in dependence on a loss/objective function that compares the predicted 3D shape data with the target output of the training example. For example, the loss function may comprise an adversarial loss, an L1 loss, an L2 loss, or any other suitable loss. The objective/loss function may be optimized using any suitable optimization process e.g. gradient-descent based methods such as stochastic gradient descent, mini-batch gradient descent, batch gradient descent, AdaGrad, Adam, RMSProp, etc.

In implementations where the second 3D generation model 208 comprises a generator neural network, the generator neural network may be trained using an adversarial training process, which makes use of a discriminator neural network to evaluate the likelihood that an output generated by the generator neural network is "real" data. The adversarial training process comprises training a generator neural network to generate outputs that are realistic (e.g. when compared to target outputs of a training dataset) such that the discriminator neural network inaccurately predicts the outputs generated by the generator neural network to be "real" data (e.g. data from a set of real training examples), while simultaneously learning a discriminator neural network that aims to accurately distinguish between "real" data and "synthetic" data that is generated by the generator neural network. Adversarial loss functions may be used to train the conditional generative adversarial network, along with a suitable optimization process e.g. gradient-descent based methods such as stochastic gradient descent, mini-batch gradient descent, batch gradient descent, AdaGrad, Adam, RMSProp, etc.

The various machine-learning models described in relation to FIG. 2 may be trained separately to each other, using the training methods described above. In some implementations, a style encoder may be trained together with first 3D generation model 205. In this way, the style encoder may learn style encodings that are adapted to the training data and processing performed by the first 3D generation model 205.

Figure 3:
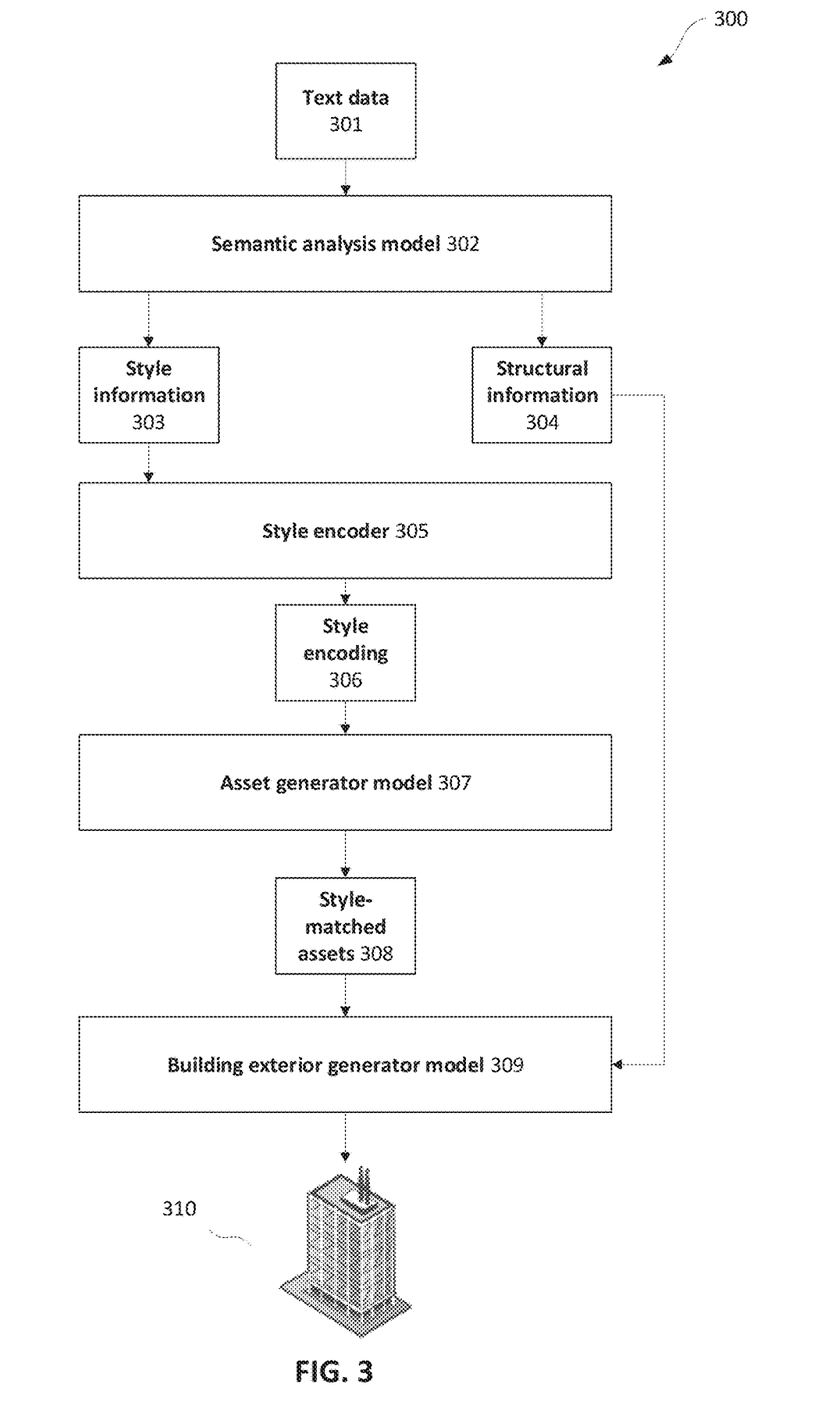
FIG. 3 illustrates another example method for generating the exterior of a video game building.

FIG. 3 illustrates another example method 300 for generating the exterior of a video game building. The method 300 processes text data 301 to generate 3D shape data 310 for the exterior of the video game building. Although FIG. 3 displays an example of the method generating 3D shape data for the entire building exterior, it will be appreciated that the method may be used to generate 3D shape data for a portion of the building exterior (e.g. one side of the building exterior).

Text data 301 is received by a semantic analysis model 302. The text data specifies style information 304 and structural information 303 for the building exterior, which is extracted by the semantic analysis model 302. An example of text data 301 may be "Generate a modern style building with 8 floors using simple glass windows". The text data 301 may be provided directly by a user input, or may otherwise be determined. For example, the user may be guided by a user interface and asked a series of questions, e.g. ("What style do you want the building to be?", "How many floors do you want the building to have?", etc.), and the corresponding answers may be used to determine the text data 301.

The text data 301 may be any digital data representing text. The text data 301 may be encoded by a sequence of vectors with each vector representing a character or word of the text. For example, a character may be a letter, a number, etc. The elements of a character vector may correspond with one character out of a set of possible characters, with each character represented by a character vector with only one non-zero element (also known as a one-hot vector). Additionally or alternatively, the text data 301 may be represented by continuous embeddings, e.g. character embeddings and/or word embeddings.

The semantic analysis model 302 processes the text data 301 and determines style information 303 and structural information 304 specified in the text data 301. In the example where the user provides a text input of "Generate a modern style building with 8 floors using simple glass windows", the style information 303 may represent "modern style building", "simple glass windows" and the structural information 304 may represent "8 floors". In this example, the semantic analysis model 302 may further determine a number of windows for each floor, and specify this as part of the structural information 304. The style information 303 and structural information 304 may each be specified as text that represents the desired properties.

The semantic analysis model 302 may comprise a machine-learning model, such as a neural network. For example, the semantic analysis model 302 may comprise a recurrent neural network that has been trained to extract style information 303 and structural information 304 from text data 301. Alternatively, the semantic analysis model 302 may comprise a transformer neural network that has been trained to extract style information 303 and structural information 304 from text data 301.

In implementations where the semantic analysis model 302 comprises a machine-learning model, the semantic analysis model 302 is trained using a plurality of training examples. Each training example comprises a training input and a target output. The training input of a training example comprises text data. The target output of a training example comprises style information and structural information specified in the text data. For example, the target output may comprise the text data of the training input wherein portions of the text data are semantically labelled as either being style information or structural information. The training input of a training example is processed in accordance with a current set of parameters of the semantic analysis model 302 and predicted style information and structural information is generated by the semantic analysis model 302. Parameters of the semantic analysis model 302 are updated in dependence on a loss/objective function that compares the predicted style information and structural information with the target output of the training example. For example, the loss function may comprise a negative-log likelihood, a cross-entropy loss, an L1 loss, an L2 loss, or any other suitable loss. The objective/loss function may be optimized using any suitable optimization process e.g. gradient-descent based methods such as stochastic gradient descent, mini-batch gradient descent, batch gradient descent, AdaGrad, Adam, RMSProp, etc.

The style information 303 is received by style encoder 305. The style encoder 305 processes the style information 303 and generates a style encoding 306. The style encoding may be a latent vector that represents properties of the style of the video game building exterior. In the above describe example of "Generate a modern style building with 8 floors using simple glass windows", style information 303 may be extracted as text specifying "modern style", "simple glass windows". The text is processed by style encoder 305 to generate a latent vector representing the style information specified in the style information 303.

The style encoder 305 may comprise a machine-learned model, e.g. a neural network. For example, the style encoder 305 may comprise a recurrent neural network that has been trained to generate style encodings 306 from style information 303. As an example, the recurrent neural network may be trained to be a language model that predicts successive elements of sequences input into the recurrent neural network. The sequence input in the above example may represent "modern style", "simple glass windows" which may be combined to form a single input sequence. An output layer may generate predictions, e.g. using a softmax layer that predicts probabilities for each characters of a set of characters, of successive elements of the sequence. A style encoding 306 may be generated after processing the entire sequence, and using a hidden state of a recurrent neural network before the softmax layer to represent the style encoding 306. Alternatively, other neural networks such as transformer neural networks may be used to generate style encodings 306 in a similar manner.

The style encoding 306 is received by an asset generator model 307. The asset generator model 307 is a model that generates assets 308 for the exterior of the video game building (e.g. windows, doors, etc.) in a style specified by the style encoding 306. A style-matched asset 308 may be represented by 3D shape data that specifies a mesh for the asset. An asset for a video game building exterior may represent any object that forms part of the exterior.

The asset generator model 307 may comprise a machine-learning model, such as a neural network. For example, the asset generator model 307 may comprise a generator neural network of a conditional generative adversarial network. The generator neural network may be configured to receive a latent vector (e.g. sampled from a noise distribution), and a conditioning input, and process these inputs to generate assets 308 for the exterior of the video game building in accordance with the conditioning input. In these implementations, the conditioning input comprises the style encoding 306 and may further comprise a selection of a particular asset (e.g. window, door) to be generated.

In implementations where the asset generator model 307 comprises a machine-learning model, the asset generator model 307 is trained using a plurality of training examples. Each training example comprises a training input and a target output. The training input of a training example comprises a style encoding, and further comprises a selection of a particular asset to be generated (e.g. a window, a door). The target output of a training example comprises 3D shape data for the asset in the style specified by the style encoding. The training input of a training example is processed in accordance with a current set of parameters of the asset generator model 307 and predicted 3D shape data for the asset is generated by the asset generator model 307. Parameters of the asset generator model 307 are updated in dependence on a loss/objective function that compares the predicted 3D shape data with the target output of the training example. For example, the loss function may comprise an adversarial loss, an L1 loss, an L2 loss, or any other suitable loss. The objective/loss function may be optimized using any suitable optimization process e.g. gradient-descent based methods such as stochastic gradient descent, mini-batch gradient descent, batch gradient descent, AdaGrad, Adam, RMSProp, etc.

In implementations where the asset generator model 307 comprises a generator neural network, the generator neural network may be trained using an adversarial training process, which makes use of a discriminator neural network to evaluate the likelihood that an output generated by the generator neural network is "real" data. The adversarial training process comprises training a generator neural network to generate outputs that are realistic (e.g. when compared to target outputs of a training dataset) such that the discriminator neural network inaccurately predicts the outputs generated by the generator neural network to be "real" data (e.g. data from a set of real training examples), while simultaneously learning a discriminator neural network that aims to accurately distinguish between "real" data and "synthetic" data that is generated by the generator neural network. Adversarial loss functions may be used to train the conditional generative adversarial network, along with a suitable optimization process e.g. gradient-descent based methods such as stochastic gradient descent, mini-batch gradient descent, batch gradient descent, AdaGrad, Adam, RMSProp, etc.

The style-matched assets 308 are received by building exterior generator model 309. The style-matched assets specify 3D shape data for each of one or more assets, which 3D shape data may be combined to form an input into the building exterior generator model 309. The building exterior generator model 309 processes the style-matched assets 308 and generates 3D shape data 310 for the exterior of the video game building. Although FIG. 3 displays 3D shape data 310 for the entire building exterior, it will be appreciated that the method may be used to generate 3D shape data for a portion of the building exterior (e.g. one side of the building exterior).

The building exterior generator model 309 may comprise a machine-learning model, such as a neural network. For example, the building exterior generator model 309 may comprise a generator neural network of a conditional generative adversarial network. The generator neural network may be configured to receive a latent vector (e.g. sampled from a noise distribution), and a conditioning input, and process these inputs to generate 3D shape data 310 for the video game building exterior in accordance with the conditioning input. In these implementations, the conditioning input comprises the plurality of style-matched assets 308 generated by the asset generator model 307.

Alternatively, the building exterior generator model 309 may comprise a procedural model. Procedural models use a procedural generation process to generate 3D shape data 310 for the exterior of the video game building, using a plurality of rules and associated parameters for the rules. For example, the rules may specify how different objects of the exterior of the video game building (as specified by the style-matched assets 308 generated by asset generator model 307) should be combined in order to form the entire exterior of the video game building. For example, the procedural generation process may use grammars which specify the different types of rules, and how they are applied to generate the exterior of the video game building. Rules may be applied at different levels, or hierarchies. For example, one or more rules may specify how walls of a video game building exterior should be combined together in accordance with style-matched assets 308 generated for each wall, a further one or more rules may specify how windows should be placed in a wall in accordance with style-matched assets generated for the windows of the wall, etc. The parameters of a rule may specify constraints on object locations, sizes, or any other appropriate aspect of a configuration of an object to which the rule is applied.

In implementations where the building exterior generator model 309 comprises a machine-learning model, the building exterior generator model 309 is trained using a plurality of training examples. Each training example comprises a training input and a target output. The training input of a training example comprises one or more assets for a video game building exterior. The target output of a training example comprises 3D shape data for the building exterior. The training input of a training example is processed in accordance with a current set of parameters of the building exterior generator model 309 and predicted 3D shape data for the building exterior is generated by the building exterior generator model 309. Parameters of the building exterior generator model 309 are updated in dependence on a loss/objective function that compares the predicted 3D shape data with the target output of the training example. For example, the loss function may comprise an adversarial loss, an L1 loss, an L2 loss, or any other suitable loss. The objective/loss function may be optimized using any suitable optimization process e.g. gradient-descent based methods such as stochastic gradient descent, mini-batch gradient descent, batch gradient descent, AdaGrad, Adam, RMSProp, etc.

In implementations where the building exterior generator model 309 comprises a generator neural network, the generator neural network may be trained using an adversarial training process, which makes use of a discriminator neural network to evaluate the likelihood that an output generated by the generator neural network is "real" data. The adversarial training process comprises training a generator neural network to generate outputs that are realistic (e.g. when compared to target outputs of a training dataset) such that the discriminator neural network inaccurately predicts the outputs generated by the generator neural network to be "real" data (e.g. data from a set of real training examples), while simultaneously learning a discriminator neural network that aims to accurately distinguish between "real" data and "synthetic" data that is generated by the generator neural network. Adversarial loss functions may be used to train the conditional generative adversarial network, along with a suitable optimization process e.g. gradient-descent based methods such as stochastic gradient descent, mini-batch gradient descent, batch gradient descent, AdaGrad, Adam, RMSProp, etc.

The various machine-learning models described in relation to FIG. 3 may be trained separately to each other, using the training methods described above. In some implementations, the style encoder 305 may be trained together with asset generator model 307. In this way, the style encoder 305 may learn style encodings that are adapted to the training data and the processing performed by the asset generator model 307.

Figure 4:
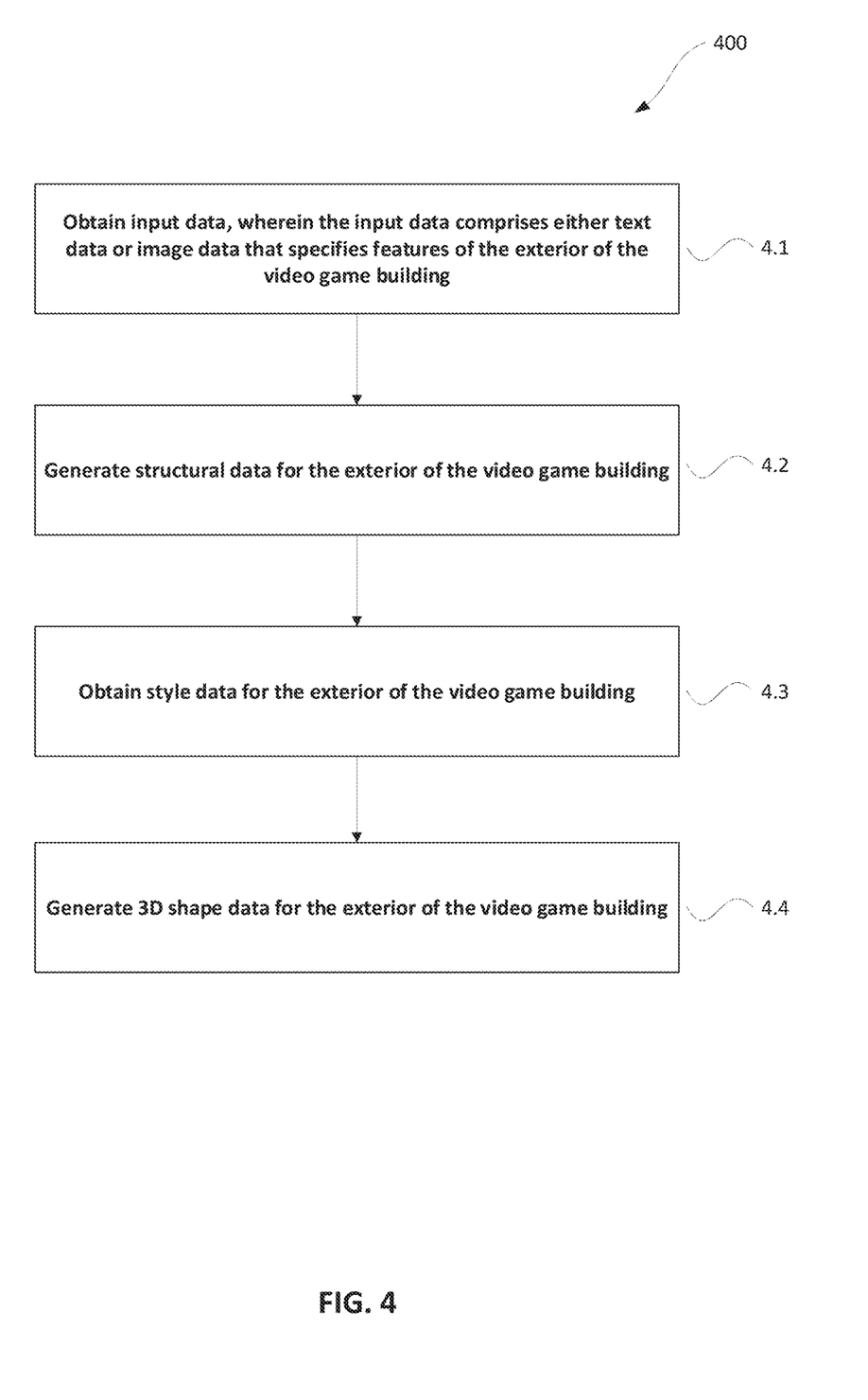
FIG. 4 is a flow diagram illustrating an example method for generating the exterior of video game buildings.

FIG. 4 is a flow diagram illustrating an example method 400 for generating the exterior of video game buildings. This flow diagram describes a general overview of the methods described in relation to FIGS. 1, 2, and 3.

In step 4.1, input data is obtained. The input data comprises either text data or image data that specifies features of the exterior of the video game building.

In step 4.2, structural data for the exterior of the video game building is generated. This comprises processing the input data using a structure extractor model, wherein the structure extractor model comprises a machine-learning model.

In scenarios where the input data comprises image data, the structure extractor model comprises an image segmentation model. The structural data generated by the structure extractor model comprises a segmented image for the image data. The image segmentation model may comprise a convolutional neural network.

In scenarios where the input comprises text data, the structure extractor model comprises a semantic analysis model. The structural data generated by the structure extractor model comprises a pattern for the exterior of the video game building extracted from the text data. For example the pattern may comprise a number of floors for the video game building, and a number of windows for each floor of the video game building. Style data for the exterior of the video game building may be obtained by processing the text data using the semantic analysis model. The semantic analysis model may comprise a neural network. For example, the neural network may be a recurrent neural network.

In step 4.3, style data for the exterior of the video game building is obtained. The style data for the exterior of the video game building may be obtained by processing text data using a semantic analysis model. Alternatively, the style data for the exterior of the video game building may be obtained by processing a reference style image using a style encoder. The reference style image represents a style for the exterior of the video game building to be generated. The style encoder may comprise a neural network, such as a convolutional neural network.

In step 4.4, 3D shape data for the exterior of the video game building is generated. This comprises processing the structural data and the style data using one or more generation models. For example the one or more generation models may comprise any suitable combination of the first and second 3D generation models described in relation to FIGS. 1 and 2, and the style encoder, asset generator model, and building exterior generator model described in relation to FIG. 3.

Although the methods and systems described herein have been described in relation to generating video game building exteriors, the described systems and methods may also be used to generate visual assets for any suitable object in a video game. For example, visual assets for bridges, cars, or other objects may be generated by the methods and systems described herein. Where machine-learning models have been described as being trained using data relating to exteriors of buildings, they may be additionally or alternatively be trained using data relating to any object for which a visual asset is to be generated.

Figure 5:
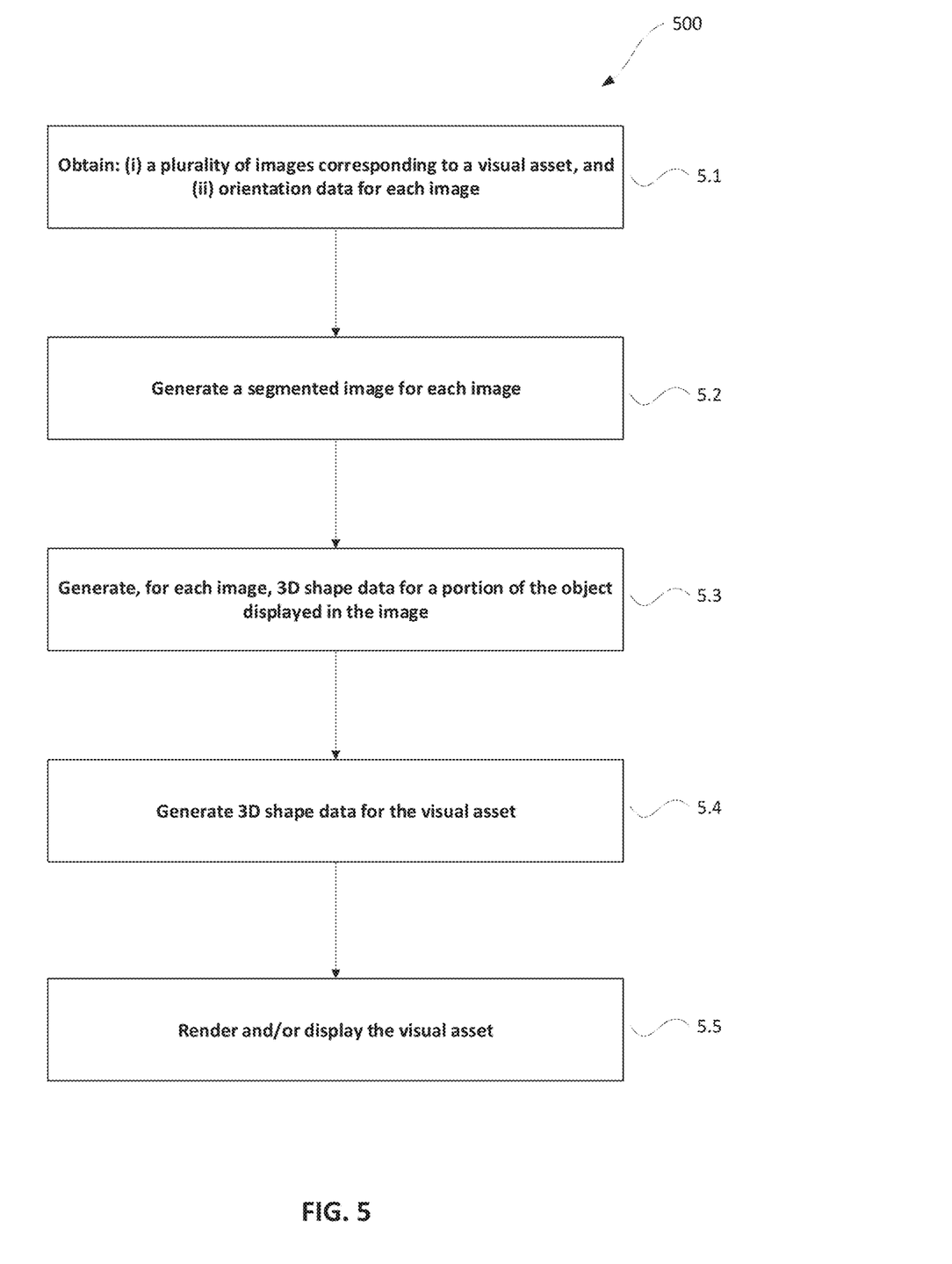
FIG. 5 is a flow diagram illustrating an example method for generating visual assets for video games.

FIG. 5 is a flow diagram illustrating an example method 500 for generating visual assets for video games. The visual asset may be an exterior of a video game building. The method 500 uses a first 3D generation model and a second 3D generation model when generating visual assets for video games. At least one of the first 3D generation model and the second 3D generation model comprises a machine-learning model. The machine-learning model may comprise a generator neural network. For example, the generator neural network may be a generator neural network of a conditional generative adversarial network.

In step 5.1, a plurality of images corresponding to the visual asset, each image showing a different view of an object to be generated in the visual asset, and (ii) orientation data for each image that specifies an orientation of the object in the image are obtained.

In step 5.2, a segmented image is generated for each image. This comprises processing the image using the image segmentation model to segment distinct portions of the image into one or more classes of a predefined set of classes. The image segmentation model may comprise a convolutional neural network.

In step 5.3, 3D shape data is generated for each image. The 3D shape data is for a portion of the object displayed in the image. This comprises processing the segmented image of the image, the orientation data of the image, and style data for the visual asset using the first 3D generation model. The first 3D generation model may comprises a generator neural network of the conditional generative adversarial network. The generator neural network may be configured to process a conditioning input for each image, the conditioning input comprising the segmented image of the image, the orientation data of the image, and the style data for the visual asset.

The style data for the visual asset may be obtained by processing a reference style image that represents a style for the visual asset to be generated using a style encoder. The style encoder may comprise a convolutional neural network.

In step 5.4, 3D shape data for the visual asset is generated. This comprises processing the generated 3D shape data of each image using the second 3D generation model. The second 3D generation model may comprise a procedural model.

In step 5.5, the visual asset may be rendered, displayed and/or caused to be displayed in a video game based on the corresponding 3D shape data. Further data such as texture information for the visual asset may also be used when rendering and/or displaying the visual asset as described above.

Figure 6:
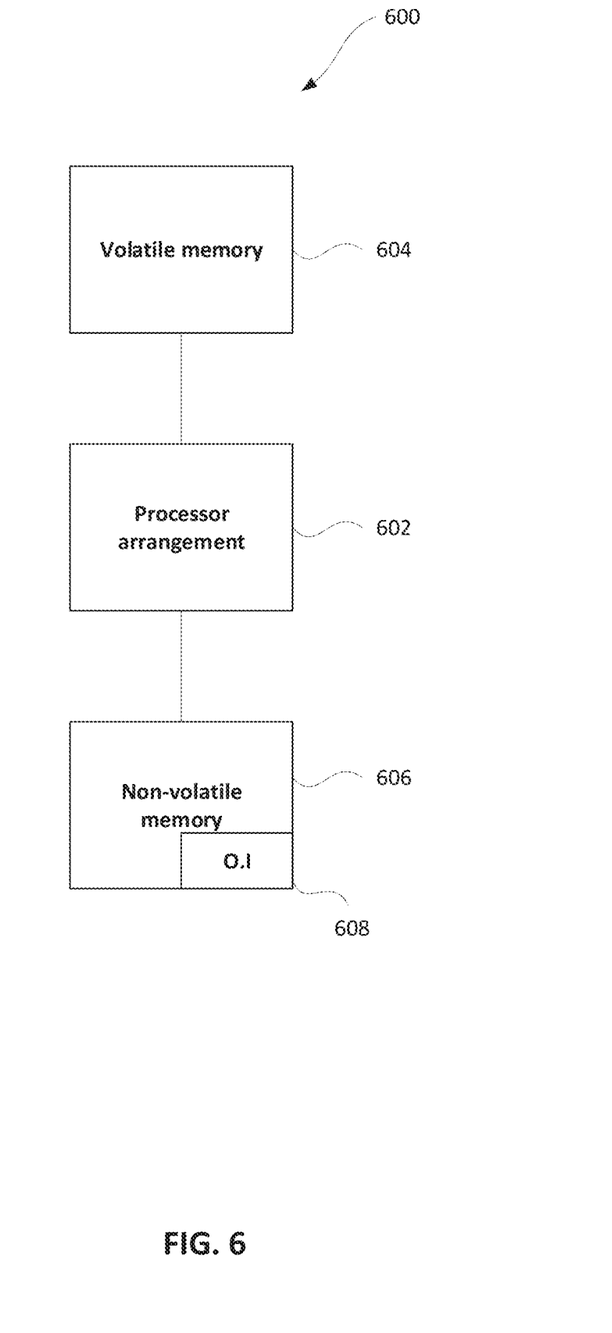
FIG. 6 shows a schematic example of a system/apparatus for performing any of the methods described herein.

FIG. 6 shows a schematic example of a system/apparatus for performing any of the methods described herein. The system/apparatus shown is an example of a computing device. It will be appreciated by the skilled person that other types of computing devices/systems may alternatively be used to implement the methods described herein, such as a distributed computing system.

The apparatus (or system) 600 comprises one or more processors 602. The one or more processors control operation of other components of the system/apparatus 600. The one or more processors 602 may, for example, comprise a general purpose processor. The one or more processors 602 may be a single core device or a multiple core device. The one or more processors 602 may comprise a central processing unit (CPU) or a graphical processing unit (GPU). Alternatively, the one or more processors 602 may comprise specialised processing hardware, for instance a RISC processor or programmable hardware with embedded firmware. Multiple processors may be included.

The system/apparatus comprises a working or volatile memory 604. The one or more processors may access the volatile memory 604 in order to process data and may control the storage of data in memory. The volatile memory 604 may comprise RAM of any type, for example Static RAM (SRAM), Dynamic RAM (DRAM), or it may comprise Flash memory, such as an SD-Card.

The system/apparatus comprises a non-volatile memory 606. The non-volatile memory 606 stores a set of operation instructions 608 for controlling the operation of the processors 602 in the form of computer readable instructions. The non-volatile memory 606 may be a memory of any kind such as a Read Only Memory (ROM), a Flash memory or a magnetic drive memory.

The one or more processors 602 are configured to execute operating instructions 608 to cause the system/apparatus to perform any of the methods described herein. The operating instructions 608 may comprise code (i.e. drivers) relating to the hardware components of the system/apparatus 600, as well as code relating to the basic operation of the system/apparatus 600. Generally speaking, the one or more processors 602 execute one or more instructions of the operating instructions 608, which are stored permanently or semi-permanently in the non-volatile memory 606, using the volatile memory 604 to temporarily store data generated during execution of said operating instructions 608.

Implementations of the methods described herein may be realised as in digital electronic circuitry, integrated circuitry, specially designed ASICs (application specific integrated circuits), computer hardware, firmware, software, and/or combinations thereof. These may include computer program products (such as software stored on e.g. magnetic discs, optical disks, memory, Programmable Logic Devices) comprising computer readable instructions that, when executed by a computer, such as that described in relation to FIG. 6, cause the computer to perform one or more of the methods described herein.

Any system feature as described herein may also be provided as a method feature, and vice versa. As used herein, means plus function features may be expressed alternatively in terms of their corresponding structure. In particular, method aspects may be applied to system aspects, and vice versa.

Furthermore, any, some and/or all features in one aspect can be applied to any, some and/or all features in any other aspect, in any appropriate combination. It should also be appreciated that particular combinations of the various features described and defined in any aspects of the invention can be implemented and/or supplied and/or used independently.

Although several embodiments have been shown and described, it would be appreciated by those skilled in the art that changes may be made in these embodiments without departing from the principles of this disclosure, the scope of which is defined in the claims.

It should be understood that the original applicant herein determines which technologies to use and/or productize based on their usefulness and relevance in a constantly evolving field, and what is best for it and its players and users. Accordingly, it may be the case that the systems and methods described herein have not yet been and/or will not later be used and/or productized by the original applicant. It should also be understood that implementation and use, if any, by the original applicant, of the systems and methods described herein are performed in accordance with its privacy policies. These policies are intended to respect and prioritize player privacy, and to meet or exceed government and legal requirements of respective jurisdictions. To the extent that such an implementation or use of these systems and methods enables or requires processing of user personal information, such processing is performed (i) as outlined in the privacy policies; (ii) pursuant to a valid legal mechanism, including but not limited to providing adequate notice or where required, obtaining the consent of the respective user; and (iii) in accordance with the player or user's privacy settings or preferences. It should also be understood that the original applicant intends that the systems and methods described herein, if implemented or used by other entities, be in compliance with privacy policies and practices that are consistent with its objective to respect players and user privacy.

We claim:

1. A computing system for generating visual assets for video games, the computing system comprising an image segmentation model, a first 3D generation model, and a second 3D generation model, wherein at least one of the first 3D generation model and the second 3D generation model comprises a machine-learning model, and the system is configured to:
    obtain: (i) a plurality of images corresponding to the visual asset, each image showing a different view of an object to be generated in the visual asset, and (ii) orientation data for each image that specifies an orientation of the object in the image;
    generate, for each image, a segmented image, comprising processing the image using the image segmentation model to segment distinct portions of the image into one or more classes of a predefined set of classes;
    generate, for each image, 3D shape data for a portion of the object displayed in the image, comprising inputting the segmented image of the image, the orientation data of the image, and style data for the visual asset to the first 3D generation model, and processing the inputs using the first 3D generation model to generate the 3D shape data for each image; and
    generating 3D shape data for the visual asset, comprising processing the generated 3D shape data of each image using the second 3D generation model.

2. The system of claim 1, wherein the machine-learning model comprises a generator neural network.

3. The system of claim 2, wherein the generator neural network is a generator neural network of a conditional generative adversarial network.

4. The system of claim 3, wherein the first 3D generation model comprises the generator neural network of the conditional generative adversarial network, wherein the generator neural network is configured to process a conditioning input for each image, the conditioning input comprising the segmented image of the image, the orientation data of the image, and the style data for the visual asset.

5. The system of claim 1, wherein the image segmentation model comprises a convolutional neural network.

6. The system of claim 1, wherein the second 3D generation model comprises a procedural model.

7. The system of claim 1 further comprising a style encoder configured to generate the style data for the visual asset by processing a reference style image that represents a style for the visual asset to be generated.

8. A computer-implemented method for generating an exterior of a video game building, the method comprising:
    obtaining input data, wherein the input data comprises text data that specifies features of the exterior of the video game building;
    generating structural data for the exterior of the video game building, comprising processing the input data using a structure extractor model, wherein the structure extractor model comprises a semantic analysis machine learning model that extracts the structural data from the text data;
    obtaining style data for the exterior of the video game building; and
    generating 3D shape data for the exterior of the video game building, comprising processing the structural data and the style data using one or more generation models.

9. The method of claim 8, wherein the input data further comprises image data, the structure extractor model comprises an image segmentation model, and the structural data generated by the structure extractor model comprises a segmented image for the image data.

10. The method of claim 9, wherein the image segmentation model comprises a convolutional neural network.

11. The method of claim 8 wherein the structural data generated by the structure extractor model comprises a pattern for the exterior of the video game building extracted from the text data.

12. The method of claim 11, wherein the pattern comprises a number of floors for the video game building, and a number of windows for each floor of the video game building.

13. The method of claim 11, wherein the style data for the exterior of the video game building is obtained by processing the text data using the semantic analysis model.

14. The method of claim 11, wherein the semantic analysis model comprises a neural network.

15. The method of claim 14, wherein the neural network is a recurrent neural network.

16. The method of claim 8, wherein the style data for the exterior of the video game building is obtained by processing a reference style image using a style encoder, wherein the reference style image represents a style for the exterior of the video game building to be generated.

17. A non-transitory computer-readable medium storing instructions, which when executed by a processor, cause the processor to:
- obtain: (i) a plurality of images corresponding to a visual asset for a video game, each image showing a different view of an object to be generated in the visual asset, and (ii) orientation data for each image that specifies an orientation of the object in the image;
- generate a segmented image for each of the plurality of images, comprising processing the image using an image segmentation model to segment distinct portions of the image into one or more classes of a predefined set of classes;
- generate, for each image, 3D shape data for a portion of the object displayed in the image, comprising inputting the segmented image of the image, the orientation data of the image, and style data for the visual asset to the first 3D generation model, and processing the inputs using the first 3D generation model to generate the 3D shape data for each image; and
- generate 3D shape data for the visual asset, comprising processing the generated 3D shape data of each image using the second 3D generation model.

18. The non-transitory computer-readable medium of claim 17, wherein the visual asset is an exterior of a video game building.

19. The non-transitory computer-readable medium of claim 17, wherein at least one of the first 3D generation model and the second 3D generation model comprises a machine-learning model, and wherein the machine-learning model comprises a generator neural network of a conditional generative adversarial network.

20. The non-transitory computer-readable medium of claim 17, wherein the image segmentation model comprises a convolutional neural network.

* * * * *